(12) United States Patent
Horowitz et al.

(10) Patent No.: US 10,988,153 B1
(45) Date of Patent: Apr. 27, 2021

(54) WAGON HAVING FOLD-DOWN SEATS AND A DETACHABLE HANDLE

(71) Applicants: Brian Horowitz, Lake Forest, CA (US); Larry Tang, Lake Forest, CA (US)

(72) Inventors: Brian Horowitz, Lake Forest, CA (US); Larry Tang, Lake Forest, CA (US)

( * ) Notice: Subject to any disclaimer, the term of this patent is extended or adjusted under 35 U.S.C. 154(b) by 0 days.

(21) Appl. No.: 16/736,717

(22) Filed: Jan. 7, 2020

(51) Int. Cl.
*B62B 3/02* (2006.01)
*B62B 5/06* (2006.01)
*B62B 5/08* (2006.01)

(52) U.S. Cl.
CPC ............... *B62B 3/02* (2013.01); *B62B 5/06* (2013.01); *B62B 5/082* (2013.01)

(58) Field of Classification Search
CPC .. B62B 3/02; B62B 5/06; B62B 5/082; A47C 1/00; A47C 1/023
See application file for complete search history.

(56) References Cited

U.S. PATENT DOCUMENTS

| 5,882,059 | A | * | 3/1999 | Romero | B60J 3/0208 |
|---|---|---|---|---|---|
| | | | | | 296/97.6 |
| 8,973,940 | B2 | | 3/2015 | Chen et al. | |
| 9,145,154 | B1 | | 9/2015 | Horowitz | |
| 9,365,225 | B2 | | 6/2016 | Henao | |
| 2016/0023674 | A1 | * | 1/2016 | Nolan | B62B 3/002 |
| | | | | | 280/651 |
| 2019/0016362 | A1 | | 1/2019 | Bowman et al. | |

* cited by examiner

*Primary Examiner* — John D Walters
*Assistant Examiner* — James J Triggs
(74) *Attorney, Agent, or Firm* — Morland C. Fischer

(57) ABSTRACT

A wagon having a basket within which a variety of articles and/or children are transported. A pair of fold-down seats are located inside the basket of the wagon on which small children can be seated. The fold-down seats are rotatable from a vertical upright position when children are seated to a horizontal flat position when no children are being transported by the wagon. Each seat has a lock that is releasably received within a catch so that the seat is held in its vertical upright position. An adjustable wagon transport handle to which a pushing or pulling force is applied is detachably connected to the front of the wagon. The wagon transport handle carries a lock by which the handle can be held in an axially extended position at which the length thereof is increased.

20 Claims, 13 Drawing Sheets

WAGON HAVING FOLD-DOWN SEATS AND A DETACHABLE HANDLE

BACKGROUND OF THE INVENTION

1. Field of the Invention

This invention relates to a wagon having a basket within which a variety of articles and/or children can be transported. A pair of fold-down seats are located inside the basket of the wagon on which small children can be seated. The seats are rotatable from a vertical upright position when children are seated to a horizontal flat position when no children are being transported by the wagon. A length adjustable handle to which a pushing or a pulling force is applied is detachably connected to the front of the wagon.

2. Background Art

Wagons are known which are capable of being folded between open and collapsed configurations. Some folding wagons have a fabric basket that is sized to carry a variety of articles or small children when the wagon is unfolded for use in its open configuration. One example of such a folding wagon is available by referring to U.S. Pat. No. 9,145,154 entitled FOLDING WAGON which issued Sep. 29, 2015.

This patented wagon has a fabric basket that is sized to transport both small children as well as articles such as sporting goods, picnic supplies, business inventory and the like. Another example of a folding wagon is that disclosed in U.S. patent application Ser. No. 16/043,819 filed Jul. 24, 2018. This wagon includes a pair of fold-down seats on which children being transported in the wagon basket can be seated. The wagon can be folded after the children have first been removed from their seats and the seats are folded flat against the bottom of the basket.

What would now be desirable is for wagons like those referred to above to include improvements. One such improvement will enable the fold-down seats to be locked in their vertical upright position when children are seated. In this manner the seats cannot be inadvertently folded when children who are being transported in the wagon basket lean forward or are subjected to traveling up and down steep hills or over bumpy terrain. Another improvement is to include a handle that is detachably connected to the wagon to receive a pushing or pulling force by which to cause the wagon to move from place-to-place. The handle can be detached from the wagon in the event its attachment causes the wagon to be too long to fit into tight areas or unable to comply with mandated space limitations.

SUMMARY OF THE INVENTION

In general terms, disclosed herein is a wagon which includes a flexible basket. The wagon transports a variety of articles and/or children that are located in the wagon basket. The wagon also includes a frame and a basket support rack above which the basket is held. The frame and the basket support rack are ideally adapted to be folded so that the wagon is correspondingly folded from an expanded open configuration during use to a compact collapsed configuration to facilitate transport and/or storage of the wagon when it is not in use. The wagon includes pairs of front and rear wheels attached to front and rear wheel support tracks of the wagon frame to roll over a surface in response to a pulling or a pushing force being applied to a length adjustable wagon transport handle that is detachably connected to the wagon at the front wheel support track.

A pair of fold-down seats that are carried by the wagon at opposite ends of the wagon basket are pivotally connected to the basket support rack above which the basket is held. Each fold-down seat has a seat frame to support the weight of a seated child, a back frame to support the back of a seated child, and a pair of side arm frames located at opposite sides of the seat frame. The back frame of each seat is pivotally connected to the seat frame thereof. The back and seat frames are initially rotated with one another relative to the basket support rack between a vertical upright position at which to accommodate a seated child and a folded horizontal position laying flat and one above the other along the bottom of the basket when no child is seated. The pair of side arm frames are then rotated towards one another from a vertical upright position to a folded horizontal position at which to lay flat over the previously folded back and seat frames.

A seat lock having a down sloping roller track is connected to each side arm frame of each fold-down seat. A locking recess is formed in the seat lock. A lock release is integrally connected to the seat lock above the locking recess. The lock release has a lock release knob and a lock release pin connected to the knob. Prior to a fold-down seat being rotated to its folded horizontal position, a roller that is connected to the seat frame is removably received within the locking recess of the seat lock. The lock release pin of the lock release initially covers the locking recess to retain the roller therewithin and thereby prevent the back and seat frames from rotating with one another. When it is desirable to rotate the fold-down seat to its folded horizontal position at the bottom of the wagon basket, an upward pulling force is applied to the lock release knob which causes the lock release pin to correspondingly move upwardly so as to uncover the locking recess formed in the seat lock. The roller is now free to be removed from the locking recess when the back frame and the seat frame to which the roller is connected rotate with one another towards the bottom of the basket. The roller rolls along the down sloping roller track of the seat lock and onto the basket support rack by which to enable the fold-down seat to be rotated to its folded horizontal position.

The length adjustable wagon transport handle is detachably connected to the wagon at a handle mounting block that is affixed to the front wheel support track of the wagon frame. A pair of outer tubular rods are fixedly connected between an upper lock connector of the wagon transport handle and a handle mounting coupler. The handle mounting coupler has a locking channel extending therethrough that is slidable into interlocking engagement with a handle mounting rail that stands upwardly from the handle mounting block by which the wagon transport handle is detachably connected to the wagon. A pair of inner tubular rods are connected between a grip at one end of the wagon transport handle and a lower lock connector. The pair of inner rods are slidable back and forth relative to the pair of outer rods by which the length of the wagon transport handle is correspondingly adjusted between axially extended and retracted positions. A spring-biased handle lock is pivotally connected and rotatable relative to the lower lock connector so as to releasably connect the upper and lower lock connectors together one above the other and thereby lock the length adjustable wagon transport handle in its aforementioned axially extended position.

DESCRIPTION OF THE PREFERRED EMBODIMENT

Figure 1:
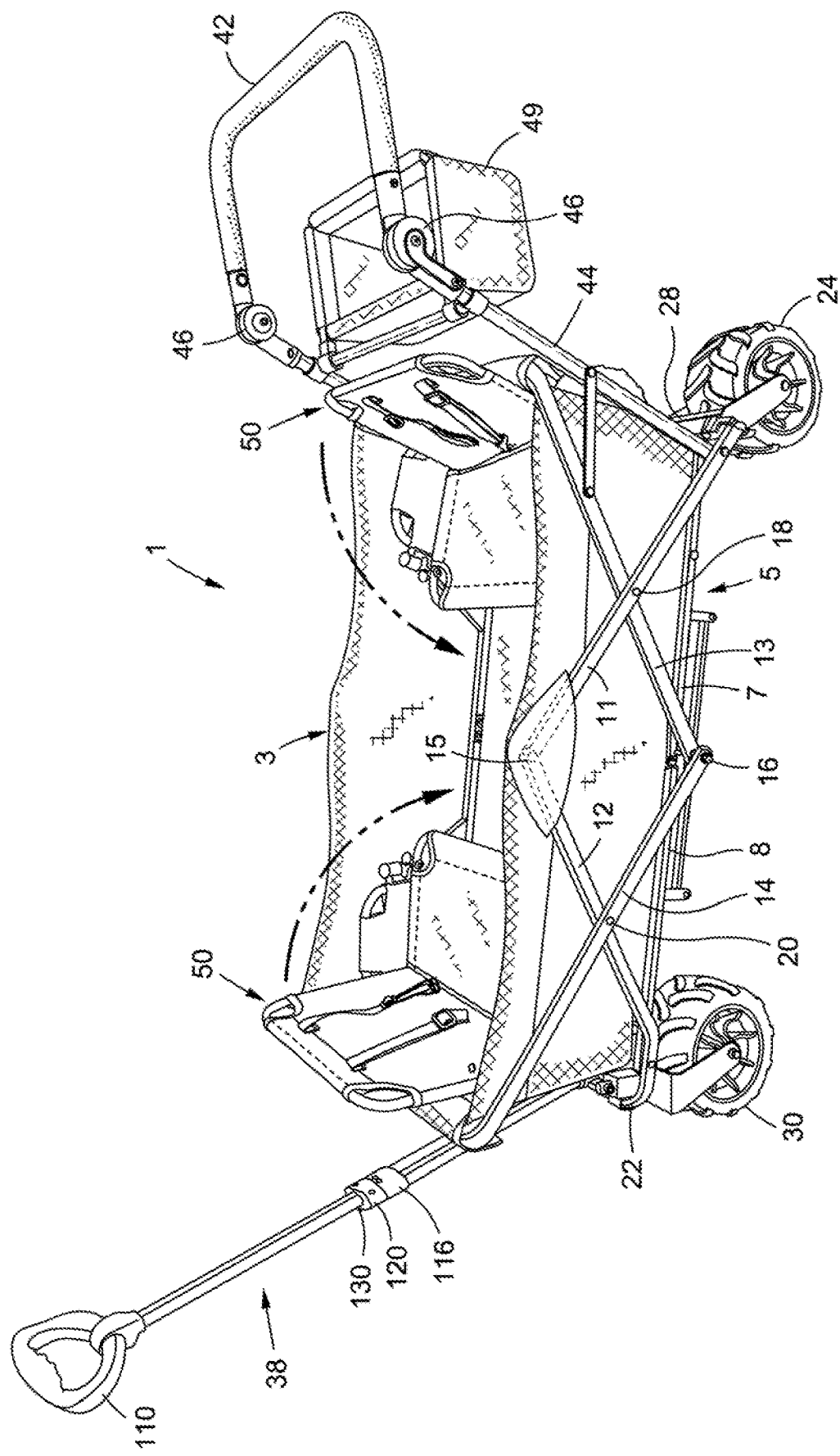
FIG. 1 is a perspective view showing a folding wagon in an expanded open configuration with a pair of fold-down seats in an upright position and located at opposite ends of a basket that is held up by a basket supporting frame of the wagon.
Figure 2:
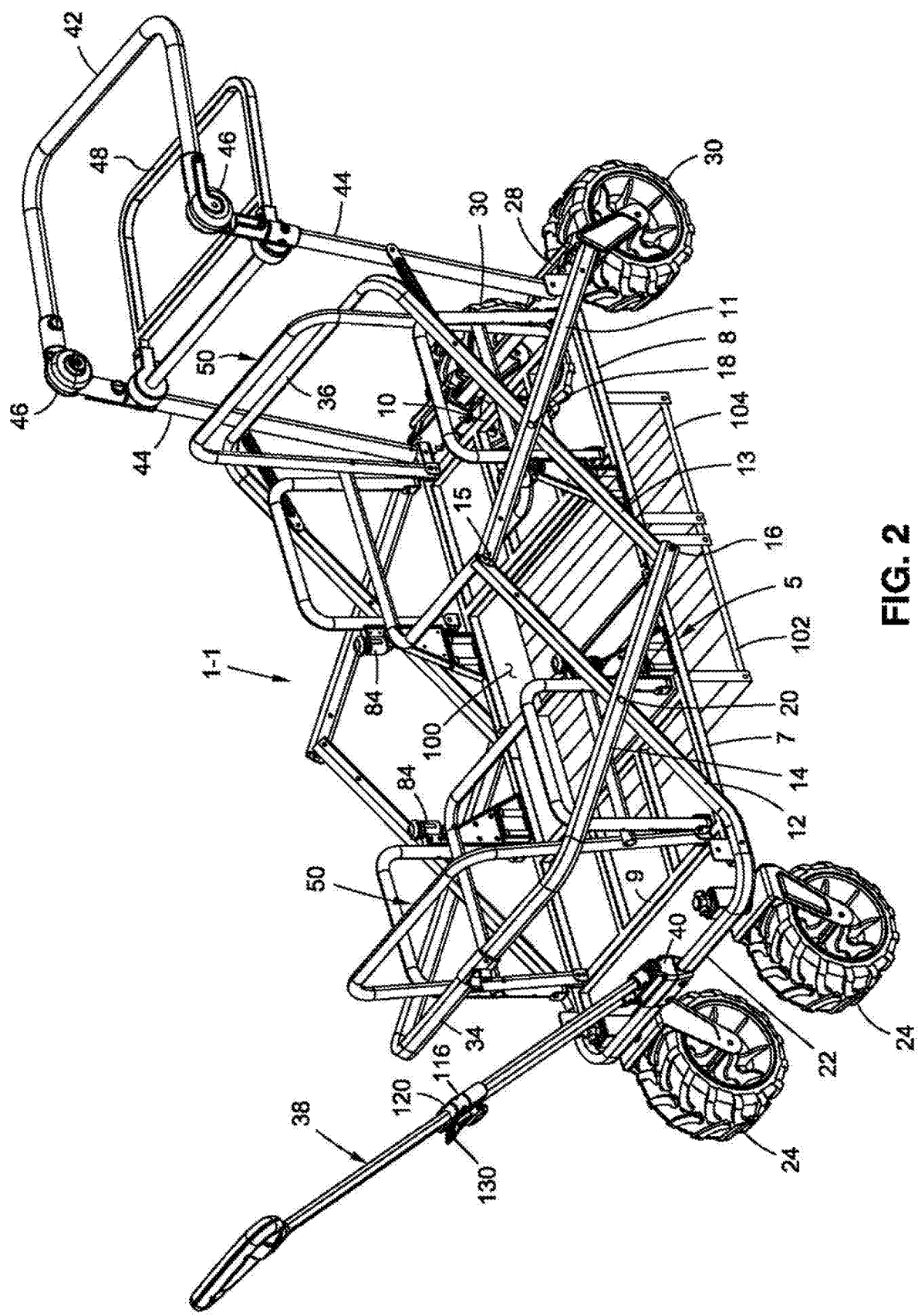
FIG. 2 shows the basket supporting frame of the wagon of FIG. 1 without the basket.
Figure 3:
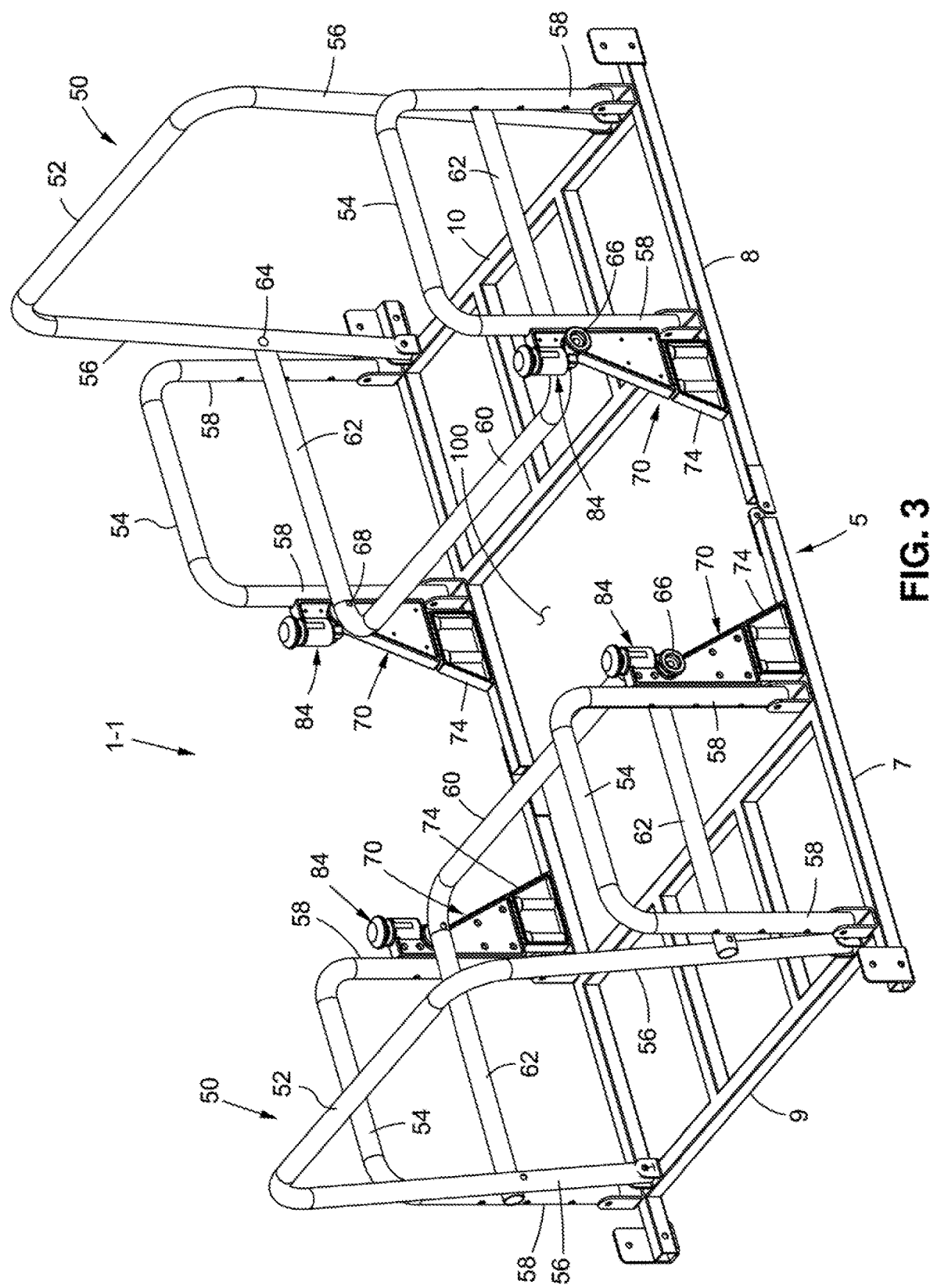
FIG. 3 shows an enlargement of the basket supporting frame of FIG. 2 with the pair of fold-down seats in their upright position.

Referring initially to FIGS. 1 and 2 of the drawings, there is shown a folding wagon 1 that is adapted to be folded between an expanded open configuration during use and a compact folded configuration at which to facilitate the wagon's transport or storage when it is not in use. The folding wagon 1 herein disclosed has features which are common to those found in U.S. Pat. No. 9,145,154 issued Sep. 29, 2015 and pending patent application Ser. No. 16/043,819 filed Jul. 24, 2018. Therefore, the common features of the folding wagons disclosed in the aforementioned patent and patent application are incorporated herein by reference and only a brief description thereof will be provided.

The folding wagon 1 includes a folding frame 1-1 (best shown in FIG. 2) that carries a fabric basket 3 within which to transport a variety of articles including, but not limited to, sporting and camping goods, picnic supplies and business inventory. For the purpose of illustration, the wagon frame 1-1 is shown in FIG. 2 without its fabric coverings shown in FIG. 1. The fabric basket 3 is open at the top and closed along the bottom, front, rear and sides. The basket 3 sits upon and stands upwardly from a flat basket support rack 5 that lies at the bottom of the frame 1-1. The basket 3 is held above the rack 5 by the wagon frame 1-1. Each side of the basket support rack 5 has a pair of side members 7 and 8 that are pivotally connected end-to-end and capable of being rotated towards one another so as to lie face-to-face in response to an uplifting pulling force applied thereto when the wagon is folded to its compact collapsed configuration. Front and rear end members 9 and 10 extend between opposite sides of the rack 5.

However, it is to be expressly understood that the advantages of this invention that will soon be described are also applicable to wagons which do not fold. In that case, the basket support rack 5 will remain flat such that the side members 7 and 8 thereof remain stationary and will not rotate relative to one another, in which case the wagon 1 will at all times remain in its expanded open configuration as shown in FIGS. 1 and 2.

In the case where the wagon will be folded, the wagon frame 1-1 shown in FIG. 2 is manipulated to enable the wagon to be correspondingly folded from its expanded open configuration at which articles are carried in the basket 3 to its compact collapsed configuration (not shown) at which the frame 1-1 and the basket 3 are collapsed and the wagon is suitable for transport or storage. Prior to it being folded, the folding frame holds the basket 3 up so as to be seated on and stand above the basket support rack 5. Reference may be made to the aforementioned U.S. Pat. No. 9,145,154 for details to explain the attachment of the basket 3 to the folding wagon frame 1-1 so that the basket 3 is held above the basket support rack 5.

Briefly, however, each side of the wagon frame 1-1 shown in FIG. 2 which lies adjacent a corresponding side of the wagon basket 3 includes a first pair of diagonally extending side support arms 11 and 12 and a second pair of diagonally extending side support arms 13 and 14. The first pair of diagonal side support arms 11 and 12 are connected to one another at first ends thereof by means of an upper pivot coupling 15, so that the support arms 11 and 12 project upwardly to make an angle of about 90 degrees. The second pair of diagonal side support arms 13 and 14 are connected to one another at first ends thereof by means of a lower pivot coupling 16, so that the support arms 13 and 14 project downwardly to also make an angle of about 90 degrees. The diagonally extending side support arms 11 and 13 are coupled to one another about midway between the first and opposite ends thereof by means of a first intermediate pivot coupling 18, and the diagonally extending side support arms 12 and 14 are coupled to one another about midway between the first and opposite ends thereof by means of a second intermediate pivot coupling 20.

The opposite end of the side support arm 12 of the first pair of side support arms 11 and 12 of the wagon frame 1-1 is connected to one end of a first wheel support track 22 that bends around the front of wagon 1. The front wheel support track 22 is spaced from the front end 9 of the basket support rack 5 at which a pair of front wheels 24 of the folding wagon 1 are mounted. Each front wheel 24 is pivotally connected to the front wheel support track 22.

The opposite end of the side support arm 11 of the first of the pair of side support arms 11 and 12 of the wagon frame 1-1 is connected to a rear wheel support track 28 that extends across the rear of wagon 1. The rear wheel support track 28 is spaced from the rear end 10 of the basket support rack 5 at which a pair of rear wheels 30 of the wagon 1 are mounted. Each rear wheel 30 is pivotally connected to the rear wheel support track 28.

A horizontal extension 34 of the side support arm 14 of the second pair of side support arms 13 and 14 of the wagon frame 1-1 bends continuously around and runs across the front of the wagon 1. The front of the wagon basket 3 is folded over and around the extension 34 of the side support arm 12 to help hold the basket 3 up so that the basket 3 will lay on and stand above the basket support rack 5 when the wagon 1 is in its expanded open configuration.

Likewise, a horizontal extension 36 of the side support arm 13 of the second pair of side support arms 13 and 14 of the wagon frame 1-1 bends continuously around and runs across the rear of the wagon 1. The rear of the wagon basket 3 is folded over and around the extension 36 of the side support arm 13 to help hold the basket 3 up so that it will lay on and stand above the basket support rack 5 when the wagon is in its expanded open configuration.

A unique and adjustable wagon transport handle 38 is detachably and pivotally connected by way of a handle mounting coupler 40 (best shown in FIG. 2) to the front wheel support track 22 that bends around the front of the wagon 1. A pulling force or a pushing force is applied to the wagon transport handle 38 by a user to cause the pairs of front and rear wheels 24 and 30 to roll over a surface by which the wagon 1 can be transported from place-to-place in a forward or backward direction. Details concerning the ability of the handle 38 to be detachable from the front wheel support track 22 will be explained hereinafter when referring to FIGS. 9-14.

A rotatable U-shaped handlebar 42 that is located at the rear of the wagon 1 is connected to the wagon frame 1-1 by way of a pair of handlebar uprights 44 that are coupled to opposite ends of the handlebar 42. As with the adjustable wagon transport handle 38, a pushing or pulling force applied to the handlebar 42 will cause the wagon to roll on its pairs of front and rear wheels 24 and 30 so as to move in a forward or rearward direction. The U-shaped handlebar 42 is pivotally connected to the wagon frame 1-1 by push-button actuated couplers 46 that are located between the opposite ends of handlebar 42 and respective ones of the handlebar uprights 44 so that the handlebar 42 will rotate when the push-button couplers 46 are pushed.

The legs of a U-shaped basket supporting frame 48 (of FIG. 2) are connected to the wagon frame 1-1 at respective ones of the handle bar uprights 44 at the rear of the wagon 1. A utility basket 49 (of FIG. 1) is attached to and carried by the wagon 1 at the basket supporting frame 48.

As in the case of patent application Ser. No. 16/043,819 referred to above, the wagon 1 herein disclosed has a pair of fold-down seats 50 that are located at the bottom of the wagon basket 3 so as to face one another at the front and rear of the wagon whereby small children can be seated and transported alone or with articles being carried inside the basket 3. Referring in this regard to FIGS. 3-8 of the drawings, the fold-down seats 50 of the wagon 1 shown in FIGS. 1 and 2 are now described along with important improvements thereto relative to the seats referred to earlier.

Being that the pair of fold-down seats 50 are identical, the features of only one of the improved seats will be described. Each fold-down seat 50 includes a generally U-shaped back frame 52 and a pair of generally U-shaped side arm frames 54 lying in front and at opposite sides of the back frame 52. The legs 56 of the U-shaped back rest 52 are pivotally connected to one end (e.g., the rear end 10) of the basket support rack 5, such that the back rest 52 is rotatable from an upstanding vertical position within the wagon basket as shown in FIG. 4 at which to support the back of a seated child to a folded horizontal position as shown in FIG. 8 at which to lay flat against the bottom of the basket above the basket support rack 5 when no child is seated in the seat 50.

Figure 4:
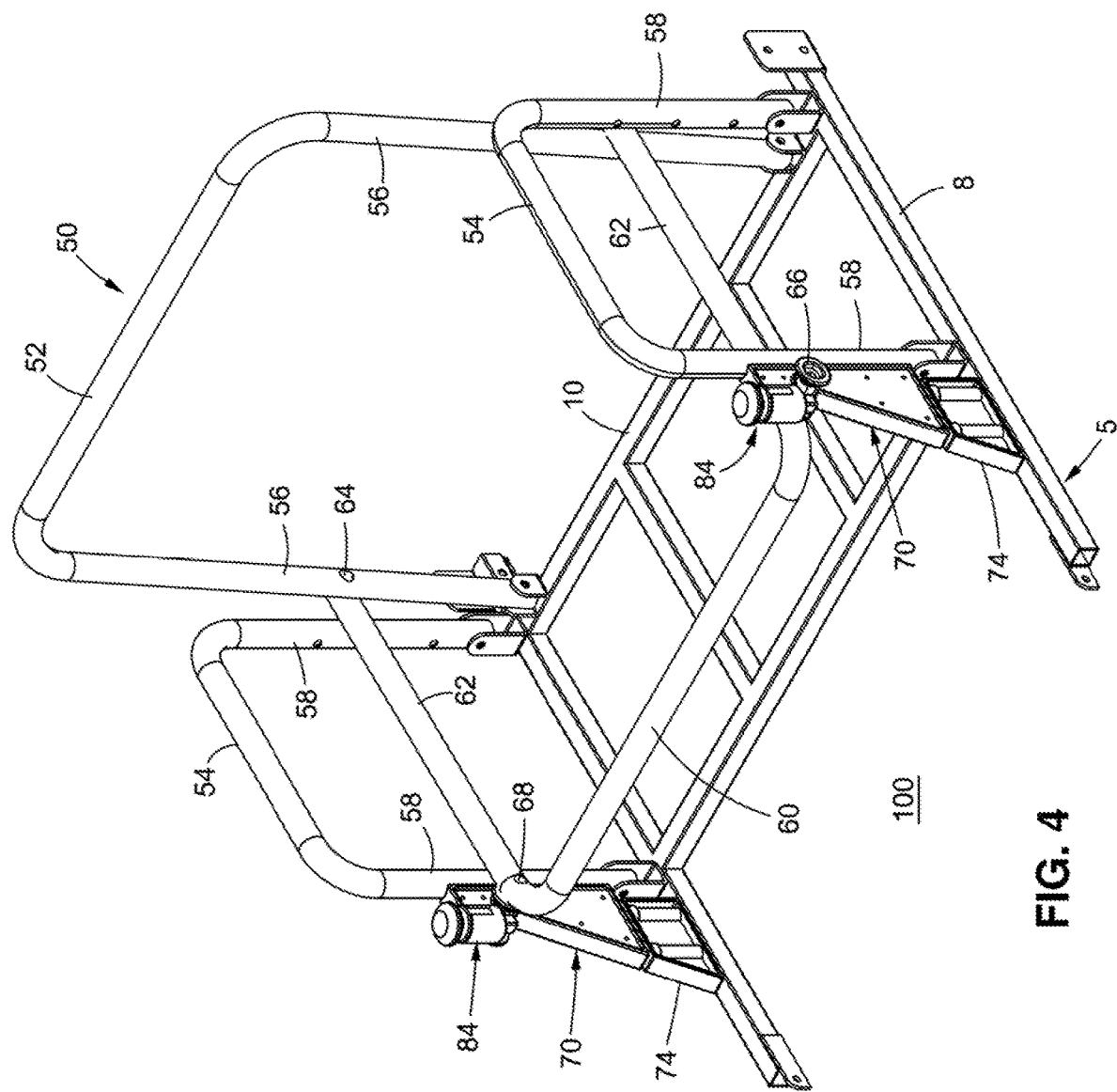
FIG. 4 shows details of one of the fold-down seats of FIG. 3 in its upright position.
Figure 8:
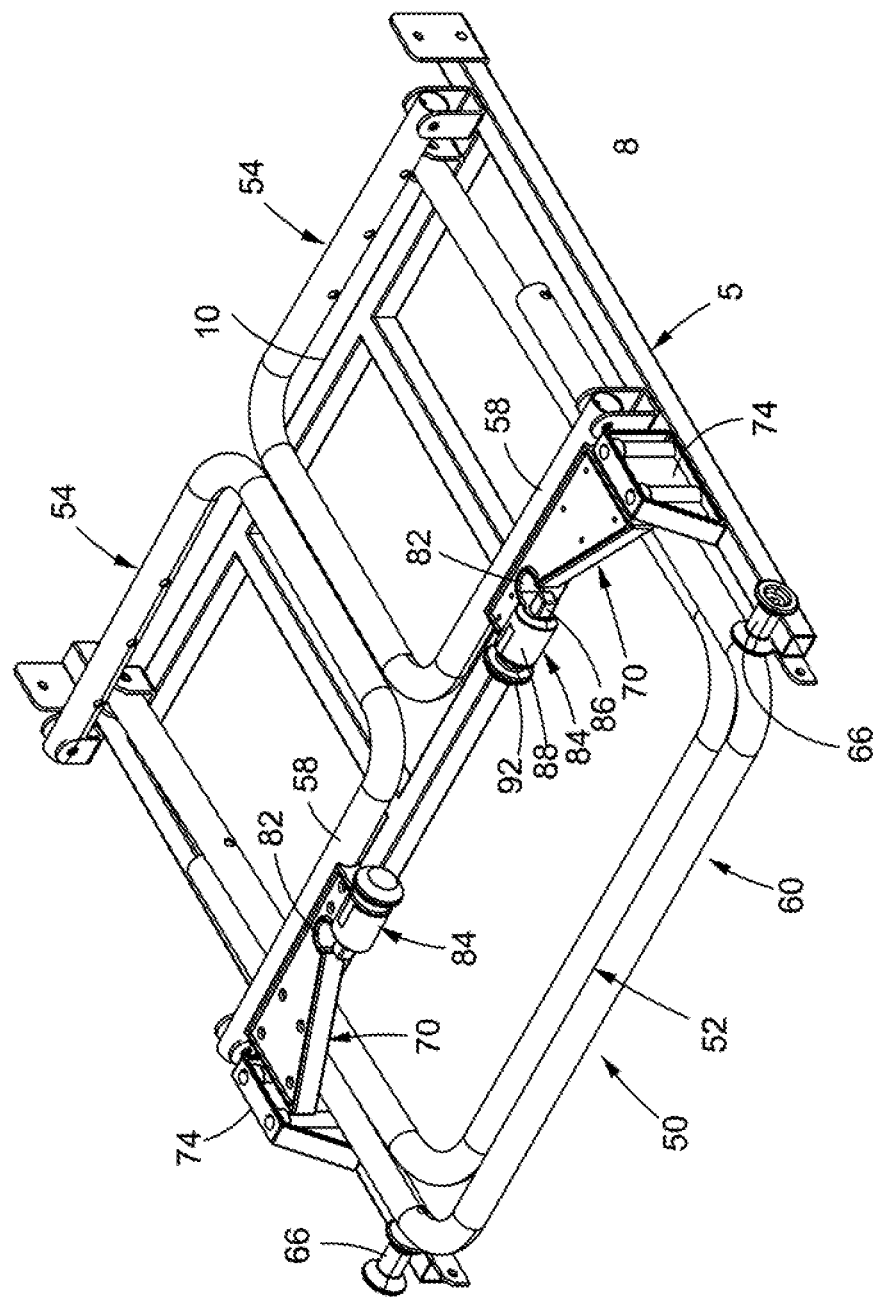
FIG. 8 shows the fold-down seat of FIG. 7 in its folded position.

The legs 58 of each of the pair of U-shaped side arm frames 54 of the seat 50 are pivotally connected to one of the side members (e.g., that designated 8) of the basket support rack 5, such that each side arm frame 54 is rotatable towards the other one from an upstanding vertical position as shown in FIG. 4 at which to partially surround a seated child to a folded horizontal position as shown in FIG. 8 at which to lay flat against the basket support rack 5 above the folded back frame 52 when no child is seated in the seat 50.

Figure 5:
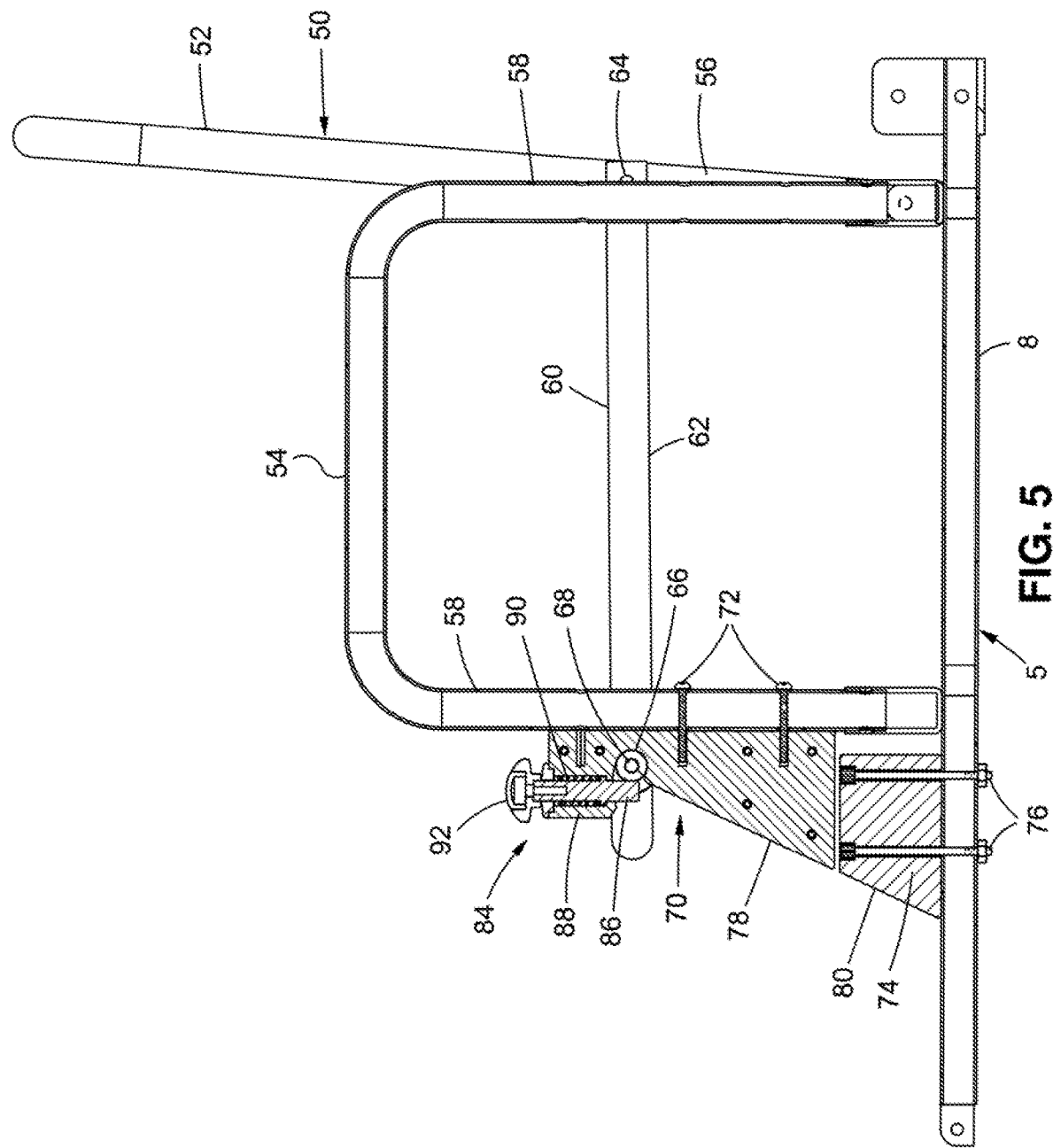
FIG. 5 is a side view of the fold-down seat shown in FIG. 4 having a seat lock attached thereto.
Figure 6:
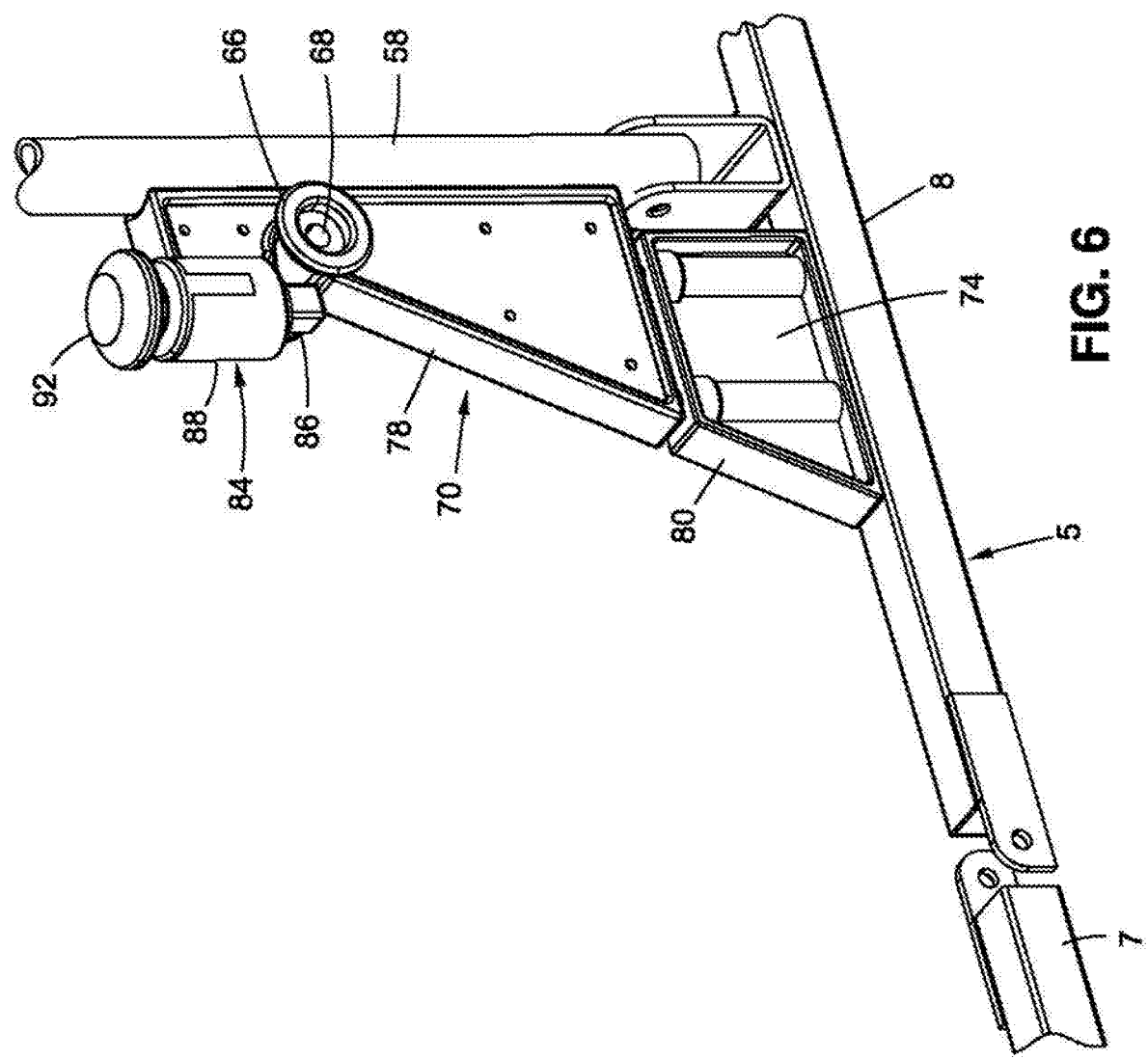
FIG. 6 is an enlarged detail of the seat lock of the fold-down seat shown in FIG. 5 in a locked position by which to lock the seat in its upright position.

Each fold-down seat 50 also includes a generally U-shaped seat frame 60 that extends outwardly from the back frame 52 and between the side arm frames 54. The seat frame 50 is configured to support the weight of a child seated in the seat 50. The legs 62 of the U-shaped seat frame 60 are pivotally connected at rear ends thereof to respective ones of the legs 56 of the U-shaped back frame 52 by means of fasteners (e.g., bolts) 64 extending therebetween. As an important feature of the wagon 1 herein disclosed and as is best shown in FIG. 5, the legs 62 of the U-shaped seat frame 60 are connected at front ends thereof to respective rollers 66 by means of fasteners (e.g., bolts) 68 extending therebetween. As will now be described each roller 66 is releasably connected to a seat lock 70 that is affixed by fasteners (e.g., bolts 72 shown in FIG. 5) to the front leg 58 of one of the pair of side arm frames 54 located at one side of the seat frame 60.

Referring in this regard to FIGS. 5-8, the seat lock 70 functions as a catch to which one of the rollers 66 is releasably connected. The seat lock 70 is located above and spaced from a seat lock support 74 that is affixed by means of fasteners (e.g., bolts 76 also shown in FIG. 5) to one of the side members 8 of the basket support rack 5. The seat lock 70 includes an upper inclined (i.e., downsloping) roller track 78, and the seat support lock 74 includes a lower inclined (i.e., downsloping) roller track 80. When the back rest 52 of the fold-down seat 50 is in its upstanding vertical position as shown in FIG. 5, the seat lock 70 and the seat lock support 74 are aligned one above the other along one front leg 58 of the U-shaped side arm frame 54 at one side of the seat frame 60 such that the upper and lower roller tracks 78 and 80 thereof establish a continuous downsloping surface over which the roller 66 can roll when the back rest 52 (and the seat frame 60 pivotally connected thereto) of one of the pair of fold-down seats 50 is rotated between its aforementioned upstanding vertical position and its folded horizontal position.

A locking recess 82 (best shown in FIGS. 7 and 8) is formed in the seat lock 70 (i.e., catch) near the top of the downsloping upper roller track 78 thereof. When the back frame 52 of the fold-down seat 50 is positioned in its upstanding vertical position of FIG. 5 at which to accommodate a seated child, the roller 66 is removably received within and captured by the locking recess 82. In this case, the back rest 52 will be locked in place in its aforementioned upstanding vertical position to prevent the fold-down seat 50 from being unintentionally folded downwardly towards and collapsed against the bottom of the basket 3.

As is best shown in FIG. 5, a manually operated spring-biased lock release 84 is integrally connected to the seat lock 70 at the top thereof above the locking recess 82 formed therein. The lock release 84 has a lock release pin 86 that extends through a spring housing 88 within which a spring 90 is received in surrounding engagement with the pin 86. A pull-actuated lock release knob 92 is coextensively connected to the top of the lock release pin 86 above the spring housing 88. The bottom of the lock release pin 86 which lies opposite the lock release knob 92 extends below the spring housing 88 at which to lie across and cover the locking recess 82 of the seat lock 70 so that the roller 66 is retained within locking recess 82 to prevent a rotation of the back frame 52 of the fold-down seat 50.

When it is desirable to rotate the back rest 52 from its upstanding vertical position to its folded horizontal position so that the fold-down seat 50 can be collapsed against the basket support rack 5 as shown in FIG. 8 when no child is seated, the lock release 84 is manipulated to cause the roller 66 to be released from the locking recess 82 of the seat lock 70 within which the roller is removably received. More particularly, an upward pulling force is exerted on the lock release knob 92 of the lock release 84. An upward movement of the lock release knob 92 causes a corresponding upward movement of the lock release pin 86 through the spring housing 88. The upwardly moving lock release pin 86 moves past the locking recess 82 so as to cause a momentary compression of the spring 90 that surrounds and engages the pin 86 within the spring housing 88.

Figure 7:
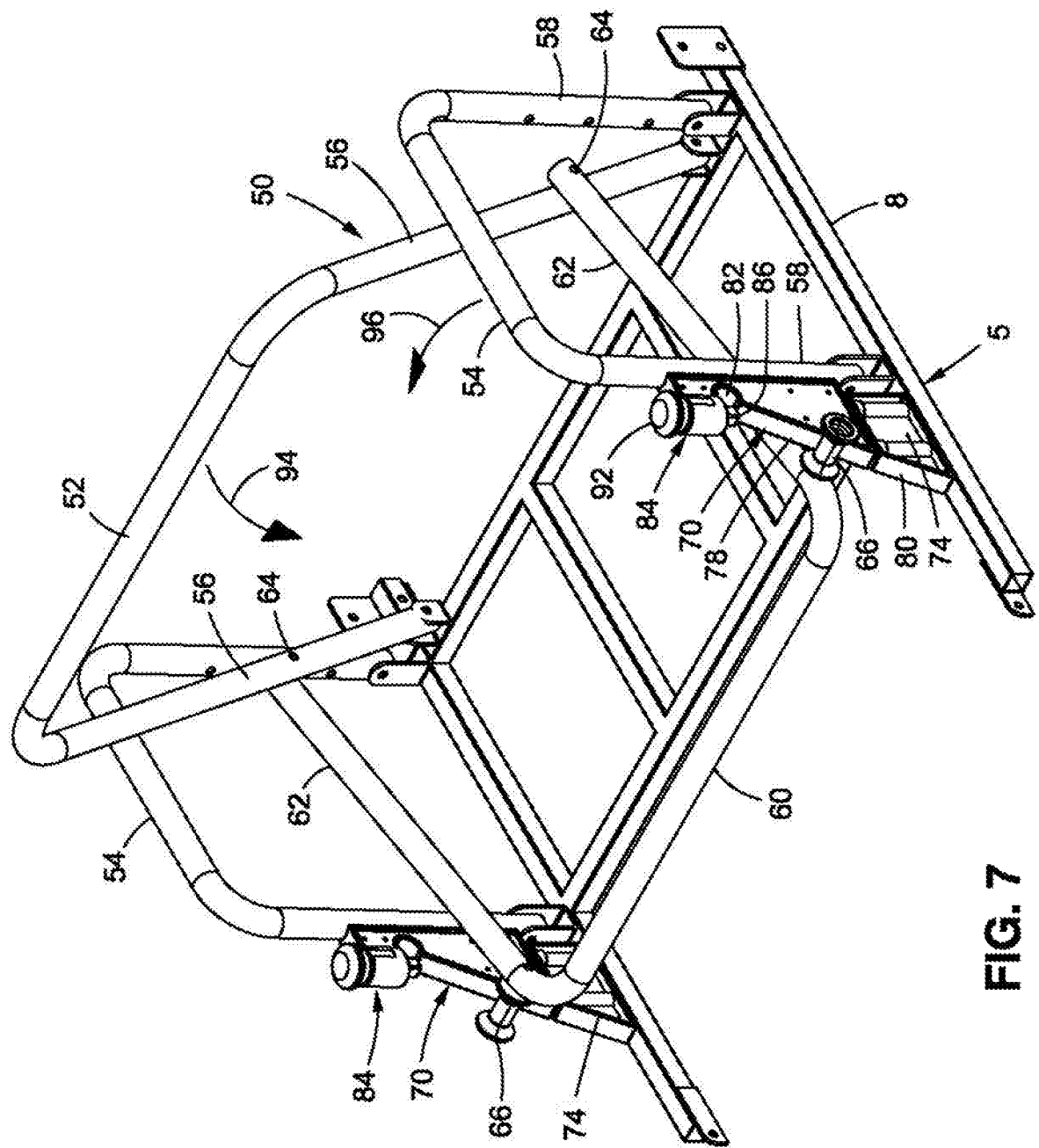
FIG. 7 shows the fold-down seat of FIG. 4 rotating to a folded position with the seat lock thereof in an unlocked position.

With the upward force still being exerted on the lock release knob 82 and the lock release pin 86 moved upwardly and past the locking recess 82, a pushing force is applied to the U-shaped back frame 52 of the fold-down seat 50 in the direction of the reference arrow 94 shown in FIG. 7. The pushing force being applied to the back frame 52 is transferred to the U-shaped seat frame 60 to which back frame 52 is coupled by fasteners 64. Because the lock release pin 86 is no longer blocking the locking recess 82 formed in the seat lock 70, the roller 66 is now free to be pushed by the seat frame 60 out of the locking recess 82 in which the roller 66 was removably received when it was desirable to lock the fold-down seat in place with the back frame 52 thereof in its upstanding vertical position as previously described.

Accordingly, the back frame 52 and the seat frame 60 that are pivotally connected together by the fasteners 64 received therethrough rotate with one another in the direction of the reference arrow 94 of FIG. 7 towards the basket support rack 5. At the same time, the pushing force being transferred to the seat frame 60 by the back frame 52 causes the roller 66 that is connected to the seat frame 60 by the fastener 68 to roll downwardly along the continuous downsloping upper and lower roller tracks 78 and 80 of the seat lock 70 and the seat lock support 74 (best shown in FIG. 7). The back frame 52 and the seat frame 60 will continue to rotate with one another until the seat frame 60 lies horizontal and flat along the bottom of the wagon basket adjacent the basket support rack 5 and the back frame 52 lies horizontal and flat against the seat frame 60. As is best shown in FIG. 8, the roller 60 is pushed completely down the seat lock 70 and the seat lock support 74 until it rolls along the side member 8 of basket support rack 5.

With the back frame 52 and the seat frame 60 lying horizontal and flat one above the other along the bottom of the basket and adjacent the basket support rack 5, each U-shaped side arm frame 54 is rotated towards the other one and downwardly towards the basket support rack 5 in the direction of the reference arrow 96 of FIG. 7. Therefore, the pair of side arm frames 54 will lie horizontal and flat over and against the previously rotated back frame 52 and the seat frame 60, such that the fold-down seat 50 is fully rotated to its folded horizontal position in the manner shown in FIG. 8. Rotating the side arm frames 54 causes the seat lock 70 that is connected to the front leg 58 of each side arm frame 54 to be simultaneously rotated along with the rotating side arm frame 54 to which it is connected. Thus, and as is best shown in FIG. 8, the seat lock 70 is rotated relative to the seat lock support 74 to lie horizontal and flat above the basket support rack 5 alongside its side arm frame 54.

When the upward pulling force being applied to the lock release knob 92 of the lock release 84 is terminated, the spring 90 which has been compressed will automatically expand. The lock release pin 86 will be pushed by the expanding spring 90 downwardly through the spring housing 88 by which to once again lie over and cover the locking recess 82 formed in the seat lock 70 (best shown in FIG. 8).

Referring briefly once again to FIGS. 2-4, there is shown a foot extension opening 100 formed through the basket support rack 5 midway between the front and rear ends 9 and 10 thereof. The foot extension opening 100 is located in front of each of the pair of fold-down seats 50 so that any child who is seated in one of the seats 50 can extend his feet downwardly through the opening 100. A pair of foot rests 102 and 104 are connected to the side members 7 and 8 so as to run laterally across the basket support rack 5. As is best shown in FIG. 2, the foot rests 102 and 104 are positioned side-by-side one another to extend downwardly from the basket support rack 5. Each foot rest 102 and 104 is closed at the bottom so that the feet of a seated child can move through the foot extension opening 100 and come to rest comfortably upon one of the foot rests 102 or 104.

The adjustable wagon transport handle 38 referred to above which is adapted to be detachably connected to the front wheel support track 22 at the front of the wagon frame 1-1 shown in FIG. 2 is now described in detail while referring concurrently to FIGS. 9-12 of the drawings. The wagon transport handle 38 has a grip 110 located at one end thereof to which a pulling or pushing force is applied to cause the wagon 1 of FIG. 1 to which the handle is attached to roll from place-to-place. Located at the opposite end of the handle 38 is a handle connector 112 (best shown in FIG. 13).

Figure 10:
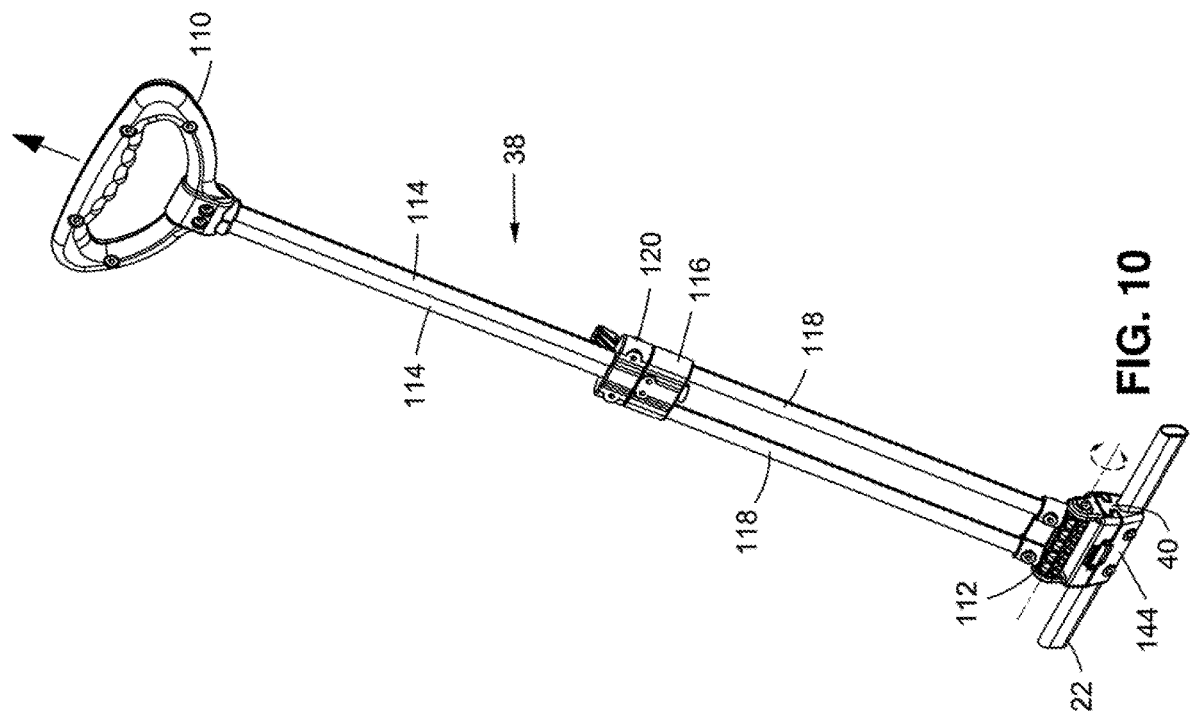
FIG. 10 shows the length adjustable wagon transport handle of FIG. 9 in an axially extended position.

A pair of slidable inner cylindrical rods 114 extend from the grip 110 to a lower lock connector 116 (best shown in FIG. 10). A pair of outer cylindrical rods 118 that lie outside the inner rods 114 are fixedly connected between an upper lock connector 120 (also best shown in FIG. 10) and the handle connector 112 (best shown in FIG. 13). The pair of inner rods 114 are slidable relative to the pair of fixedly connected outer rods 118 in response to a pulling or pushing force applied to the grip 110 to either lengthen or shorten the wagon transport handle 38 between axially extended and retracted positions as may be needed depending upon space limitations.

Figure 9:
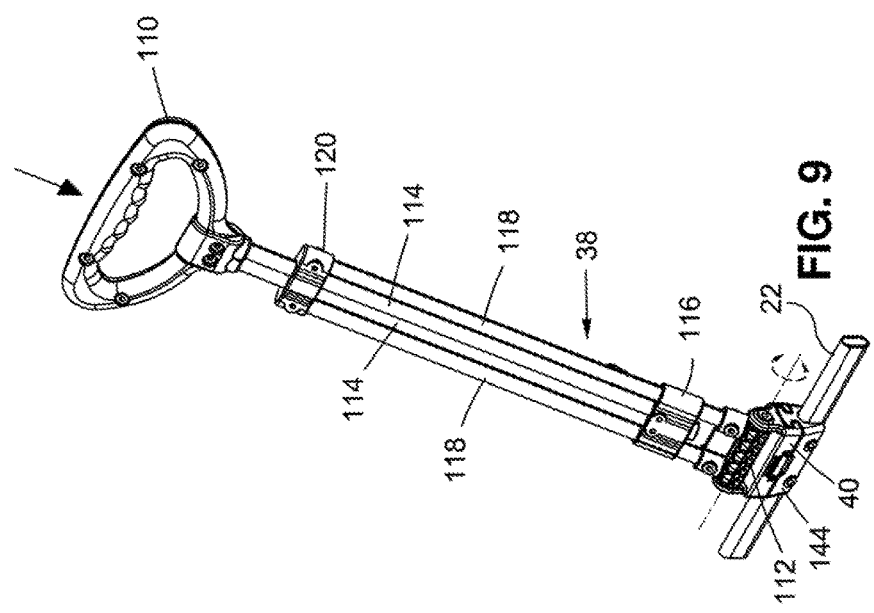
FIG. 9 shows a length adjustable wagon transport handle detachably connected to the basket supporting frame of FIG. 2 with the handle in a retracted position.

In particular, and as is shown in FIGS. 9 and 10, the pair of inner rods 114 are slidable up and down through the upper lock connector 120 to which the pair of outer rods 118 are fixedly connected. The lower lock connector 116 to which the pair of inner rods 114 are connected surrounds and slidably receives therethrough each of the outer rods 118. Thus, the lower lock connector 116 slides along the pair of outer rods 118 as the inner rods 114 move up and down with the grip 110. At the same time, the lower lock connector 116 which is carried by the pair of sliding inner rods 114 will move upwardly towards and into locking engagement with the upper lock connector 120 (best shown in FIG. 10) in response to an upward pulling force applied to the grip 110 or move downwardly and away from upper lock connector 120 (best shown in FIG. 9) in response to a downward pushing force applied to grip 110.

Figure 11:
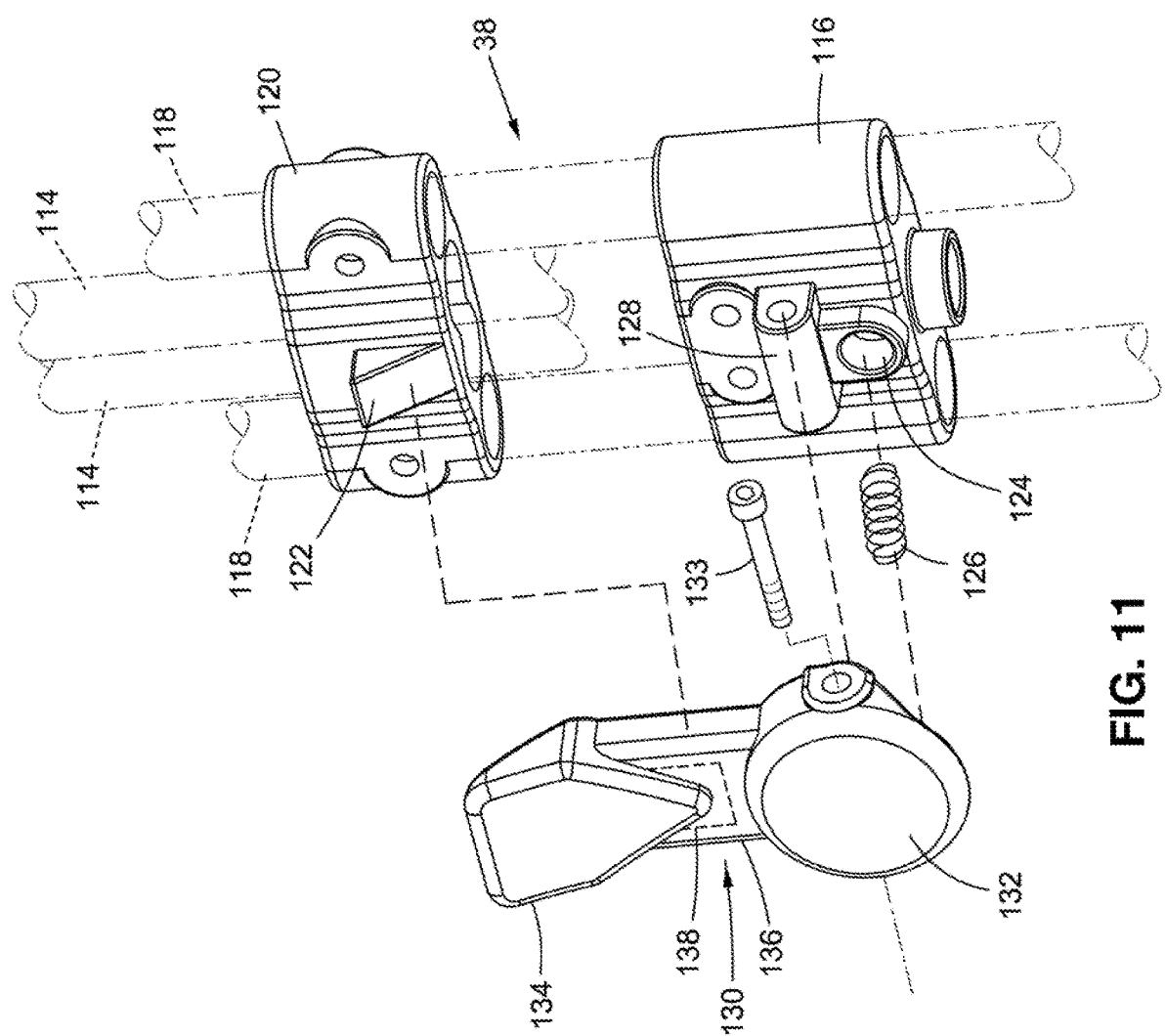
FIG. 11 shows a handle lock for locking the length adjustable wagon transport handle in the axially extended position of FIG. 10.

As is best shown in FIG. 11, the upper lock connector 120 to which the pair of outer rods 118 are connected includes a locking tab 122 projecting outwardly therefrom. The lower lock connector 116 which is moved by the pair of sliding inner rods 114 towards and away from the upper lock connector 120 includes a spring pocket 124 within which a (e.g., coil) spring 26 is retained. Located on the lower lock connector 116 adjacent the spring pocket 124 is a cylindrical locking base mount 128.

Figure 12:
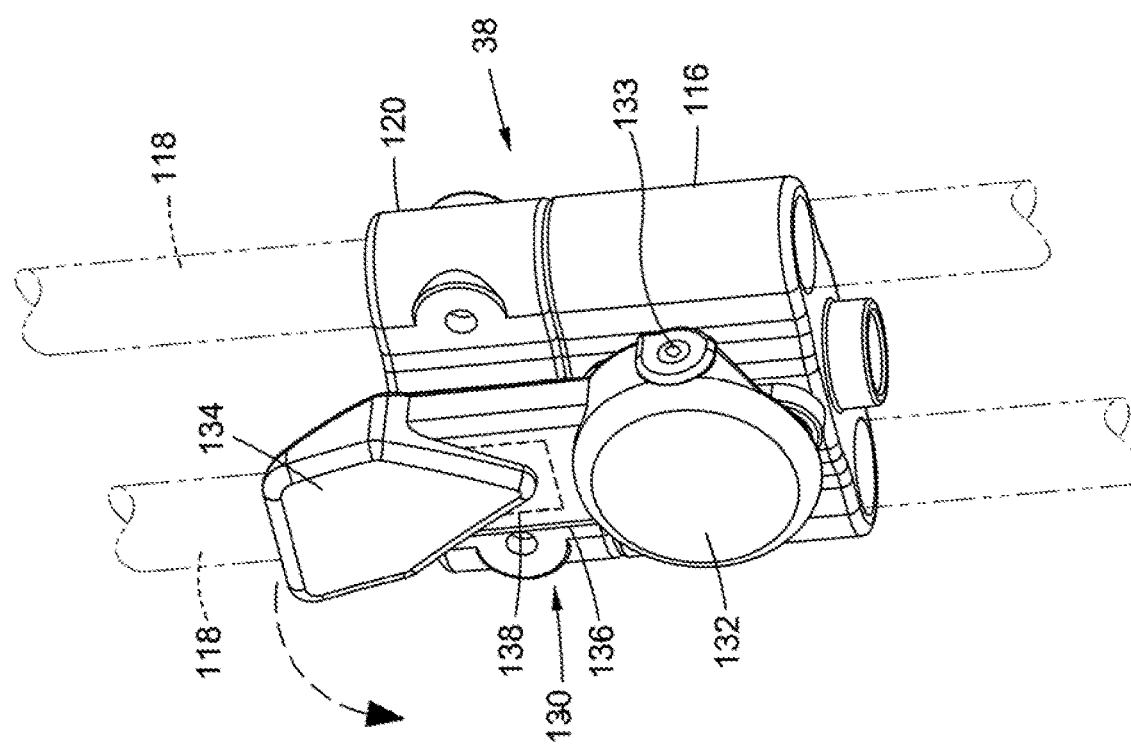
FIG. 12 shows the handle lock of FIG. 1 pivotally connected to the length adjustable wagon transport handle for locking the handle in its axially extended position.

A locking handle 130 is shown in FIGS. 11 and 12 by which to detachably connect the lower and upper lock connectors 116 and 120 together one above the other after an upward pulling force is applied to the grip 110 of the wagon transport handle 38 of FIG. 10 so that the pair of inner rods 114 slide relative to the pair of outer rods 118 and move upwardly through the upper lock connector 120, whereby the wagon transport handle 38 is increased in length to its axially extended position.

A pivoting locking base 132 that is located at one end of the locking handle 130 is coupled to the cylindrical locking base mount 128 of the lower lock connector 116 by means of a fastener 133 such that the locking handle 130 is rotatable relative to connector 116. The spring 126 extends outwardly from the spring pocket 124 to contact the bottom of the locking base 132. A lift-up locking catch 134 which is located at the opposite end of the locking handle 130 is connected to the pivoting locking base 132 by way of a force transmitting arm 136 extending therebetween. A locking cavity 138 is formed within the bottom of the force transmitting arm 136. The locking cavity 138 is positioned and sized so that when the locking base 132 of the locking handle 130 is pivotally connected to the lower lock connector 116 at the locking base mount 128 thereof, the locking tab 122 that projects from the upper lock connector 120 will be removably received by (i.e., snap-fit within) the locking cavity 138 by which to connect the lower and upper lock connectors 116 and 120 to one another in the manner shown at FIG. 12.

That is, when the pair of inner rods 114 are pulled upwardly relative to and past the pair of outer rods 118 and the lower lock connector 116 is correspondingly pulled upwardly by the inner rods 114 so that the upper and lower lock connectors 120 and 116 lie one above the other, the spring 126 within the spring pocket 124 is expanded to urge the lift-up locking catch 134 of the locking handle 130 to rotate towards and against the upper lock connector 120. In this case, the locking tab 122 of the upper lock connector 120 is captured and retained in locking engagement with the locking handle 130 at the locking cavity 138 formed in the bottom of the force transmitting arm 136, whereby the lower and upper lock connectors 116 and 120 are connected one to the other, and the wagon transport handle 38 is locked in its axially extended and lengthened position as shown in FIG. 10.

When it is desirable to shorten the length of the wagon transport handle 38 to its retracted position, a lifting force is applied in the direction of the reference arrow shown in FIG. 12 to the lift-up locking catch 134 of the locking handle 130. The lifting force is transmitted to the pivoting locking base 132 of the locking handle 130 by way of the force transmitting arm 136 thereof. Accordingly, the locking handle 130 rotates in a first direction at the locking base mount 128 of the lower lock connector 116, whereby the spring 126 lying below the locking base 132 is momentarily compressed, and the lift-up locking catch 134 is lifted off and out of its former locking engagement with the upper lock connector 120, such that the locking tab 122 of the upper lock connector 120 is removed from its receipt by the locking cavity 138 formed in the force transmitting arm 136.

A pushing force may now be applied to the grip 110 of the wagon transport handle 38 to cause the pair of inner rods 114 to slide downwardly from their axially extended position of FIG. 10 through the upper lock connector 120. At the same time, the lower lock connector 116 will slide downwardly along the pair of outer rods 118 away from the upper lock connector 18. Once the length of the wagon transport handle 38 has been adjusted, the lifting force being applied to the lift-up locking catch 134 is terminated by which to enable the previously compressed spring 128 to expand and the locking handle 130 to thereby be automatically rotated in an opposite direction at the locking base mount 128 so as to return to its initial position shown in FIG. 9 prior to rotation.

Figure 13:
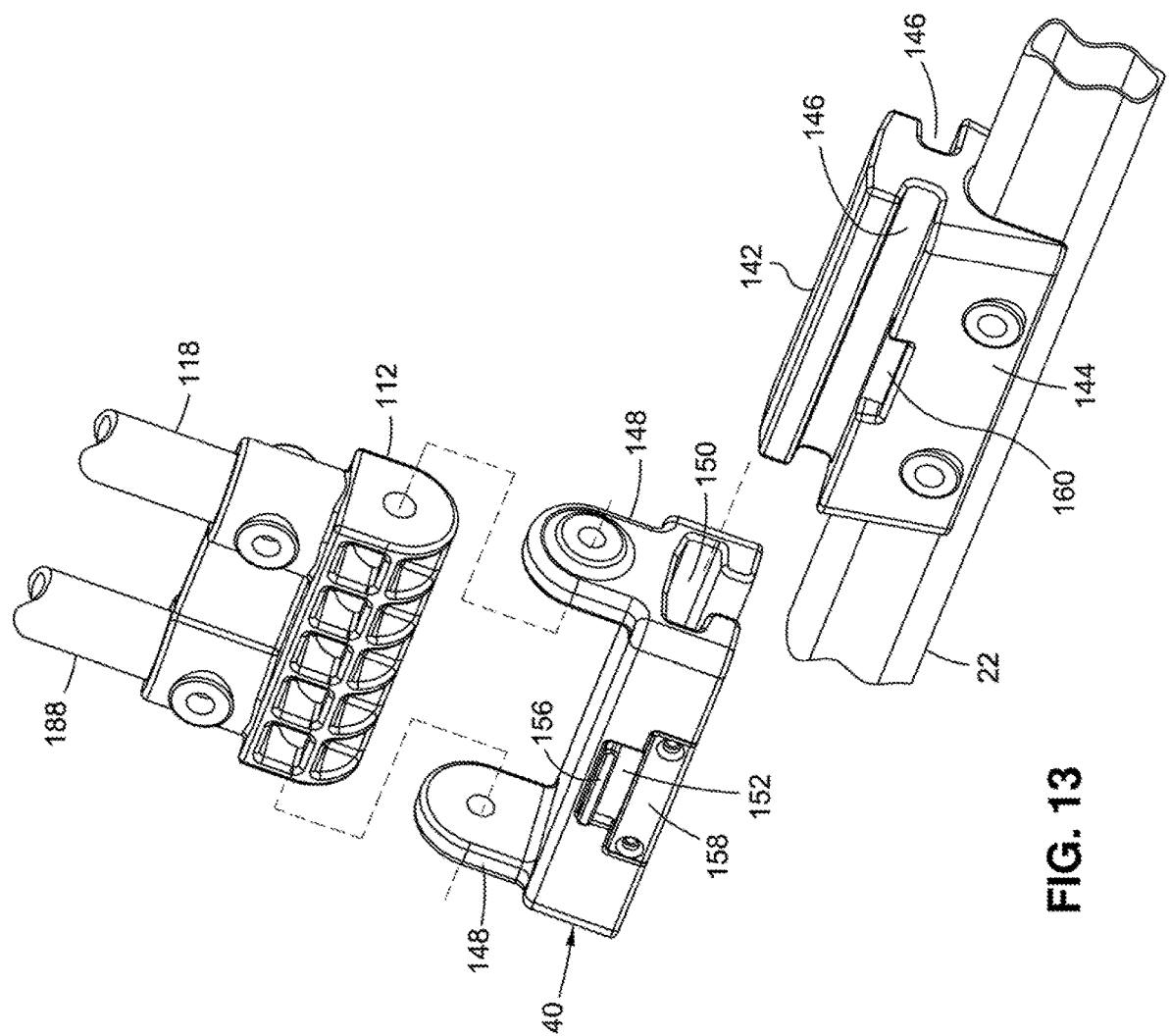
FIG. 13 is an exploded view to illustrate the wagon transport handle moving into interlocking engagement with a handle mounting rail of a handle mounting block affixed to the basket supporting frame.
Figure 14:
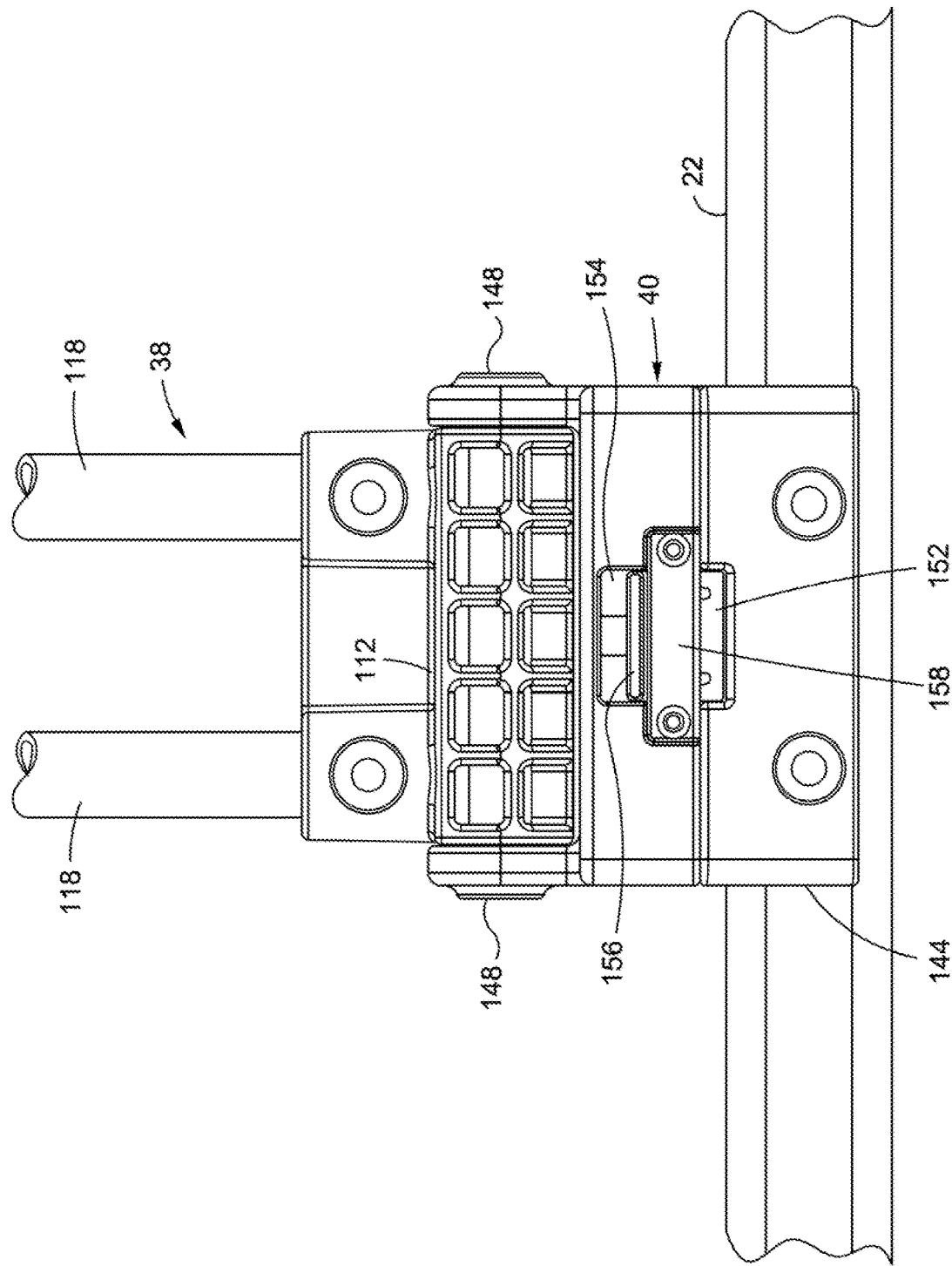
FIG. 14 shows the wagon transport handle detachably connected to the basket supporting frame at the handle mounting block affixed thereto.

An important improvement to the wagon transport handle 38 is now described while referring to FIGS. 13 and 14 of the drawings. FIG. 13 shows a handle mounting rail 142 standing upwardly from a handle mounting block 144 that is fixedly connected to the front wheel support track 22 of the wagon frame 1-1 lying in front of the basket support rack 5 shown in FIG. 2. A pair of longitudinally extending mounting guide grooves 146 run along the sides of the upstanding handle mounting rail 142.

As previously described, a handle connector 112 is located at one end of the wagon transport handle 38 so as to lie opposite the grip 110 (best shown in FIGS. 9 and 10). The handle connector 112 is configured to be pivotally connected between a pair of spaced, parallel aligned ears 148 that stand upwardly from the handle mounting coupler 40 to which reference was earlier made. The pivotal connection of the handle connector 112 to the handle mounting coupler 40 at the ears 148 thereof enables the wagon transport handle 38 to rotate back and forth relative to coupler 40 in the direction of the reference arrow shown in FIG. 9.

The handle mounting coupler 40 has a locking channel 150 running longitudinally therethrough. The locking channel 150 is configured to slidably and removably receive the handle mounting rail 142 and the mounting guide grooves 146 of the handle mounting block 144. By virtue of the foregoing, the wagon transport handle 38 can be detachably connected by way of the handle mounting coupler 40 to the wagon frame 1-1 at the front wheel support track 22 thereof (best shown in FIG. 14) to which the handle mounting block 144 is affixed. This feature is particularly advantageous in cases where it is desirable to reduce the length of the wagon for storage or to fit into tight spaces.

To reliably hold the handle mounting coupler 40 in place in interlocking engagement with the upstanding handle mounting rail 142 of the handle mounting block 144, a push-responsive locking tongue 152 is slidable up and down through a tongue guide 154 (best shown in FIG. 14) that is formed within the front of the handle mounting coupler 40. A force responsive lip 156 projects outwardly from the top of the locking tongue 152. A downward pushing force applied to the lip 156 causes the locking tongue 152 to slide downwardly through the tongue guide 154 behind a tongue retainer 158 from an unlocked position as shown in FIG. 13 to a locked position as shown in FIG. 14.

When the locking tongue 152 is pushed through the tongue guide 154 to its locked position of FIG. 14, it will extend downwardly from the handle mounting coupler 40 for receipt within a locking tongue recess 160 that is formed in the front of the handle mounting block 144 below tongue guide 154. The receipt of the locking tongue 152 by the locking tongue recess 160 prevents the handle mounting coupler 40 from inadvertently sliding off the handle mounting rail 142 in order to prevent an unintended separation of the wagon transport handle 38 from the handle mounting block 144.

When it is desirable to disconnect the wagon transport handle 38 from the wagon 1 of FIG. 1, an upward pushing force is first applied to the force responsive lip 156 to cause the locking tongue 152 to slide upwardly and out of the locking tongue recess 160 so as to move back to its unlocked position in the tongue guide 154 as shown in FIG. 13. The handle mounting coupler 40 is now free to be pulled off the handle mounting block 144 and out of its interlocking engagement with the handle mounting rail 142 of the handle mounting block at which time rail 142 slides outwardly from the locking channel 150 of coupler 40.

The invention claimed is:

1. A wagon having a front and a rear and comprising:
a frame lying between the front and the rear of the wagon;
a basket support rack;
a basket having an open top and a closed bottom, said basket being held above said basket support rack by said frame;
at least one wheel connected to said frame to enable said wagon to roll along a surface from place-to-place; and
a seat located inside said basket and pivotally connected to said basket support rack, said seat being rotatable relative to said basket support rack between a vertical position standing upwardly within said basket and a horizontal position lying substantially flat along the closed bottom of said basket, said seat having a seat portion adapted to support the weight of an individual seated in the seat and a back portion pivotally coupled to said seat portion and adapted to support the back of the seated individual, said seat portion and said back portion being pivotally connected together and rotating simultaneously with one another within said wagon when said seat rotates between said vertical and horizontal positions, and said seat also having a seat lock by which to prevent said seat portion and said back portion from rotating with one another to thereby hold said seat in said vertical position.

2. The wagon recited in claim 1, wherein said seat also has a pair of side portions located at respective sides of said seat portion, said side portions being rotatable towards the closed bottom of said basket when said seat is rotated from said vertical position to said horizontal position such that said side portions lay substantially flat over said back and said seat portions.

3. The wagon recited in claim 2, wherein said seat lock extends between the seat portion of said seat and one of said pair of side portions of said seat.

4. The wagon recited in claim 3, wherein said seat lock is detachably connected to the one of said pair of side portions of said seat.

5. The wagon recited in claim 4, further comprising a catch attached to and rotatable with the one of said pair of side portions of said seat, said catch having a locking recess formed therein, and said seat lock being removably received within said locking recess by which to hold said seat in said vertical position.

6. The wagon recited in claim 5, wherein said seat lock includes a roller connected to the seat portion of said seat and removably received within the locking recess of said catch by which to hold said seat in said vertical position.

7. The wagon recited in claim 6, further comprising a lock release connected to and rotatable with the one of said pair of side portions of said seat, said lock release having a lock release pin being movable relative to said catch from a first position at which to cover the locking recess of said catch and thereby prevent the removal of said roller received within said locking recess to a second position at which said locking recess is uncovered to thereby permit the removal of said roller from said locking recess when said seat and back portions rotate simultaneously with one another and said seat rotates from said vertical position to said horizontal position.

8. The wagon recited in claim 7, wherein said catch has a downsloping roller track, said roller rolling along said downsloping roller track when said roller is removed from the locking recess of said catch and said seat rotates to said horizontal position.

9. The wagon recited in claim 7, wherein said lock release also has a lock release knob connected to said lock release pin and responsive to a force that is manually applied thereto to cause said lock release pin to move from said first position to said second position.

10. The wagon recited in claim 7, wherein said lock release also has a spring housing and a spring located therein, said lock release pin moving through said spring housing and said spring lying in surrounding engagement with said lock release pin within said spring housing, such that said spring is compressed when said lock release pin moves through said spring housing from said first position to said second position.

11. A wagon having a front and a rear and comprising:
a frame lying between the front and the rear of the wagon;
a basket having an open top and a closed bottom, said basket being held up by said frame;
at least one front wheel connected to the front of the wagon, and at least one back wheel connected to the rear of the wagon;
a wagon transport handle detachably connected to said wagon and responsive to a pulling or a pushing force applied thereto for causing said wagon to roll from place-to-place on said at least one front wheel and said at least one back wheel, said wagon transport handle having a grip at one end thereof and a handle mounting coupler at the opposite end; and
a handle mounting block affixed to said wagon and having a handle mounting rail, said handle mounting coupler having a locking channel extending therethrough and being configured to slidably and removably receive said handle mounting rail therewithin, whereby said handle mounting coupler and said handle mounting rail move into interlocking engagement with one another and said wagon transport handle is detachably connected to said wagon.

12. The wagon recited in claim 11, said wagon further comprising a front wheel support track located at the front of said wagon to which said at least one front wheel is connected and a rear wheel support track located at the rear of said wagon to which said at least one rear wheel is connected, said wagon transport handle detachably connected to said wagon at one of said front wheel support track or said rear wheel support track.

13. The wagon recited in claim 11, wherein the handle connector at the opposite end of said wagon transport handle is pivotally connected to said handle mounting coupler so that said wagon transport handle is rotatable relative to handle mounting coupler.

14. The wagon recited in claim 11, wherein said handle mounting coupler has a locking tongue and said handle mounting block has locking tongue receiving recess formed therein, said locking tongue being responsive to a pushing force applied thereto by which to cause said locking tongue to move relative to said handle mounting block from a first position located outwardly from the locking tongue receiving recess of said handle mounting block to a second position located within said locking tongue receiving recess by which to prevent the removal of said handle mounting rail from its receipt by the locking channel extending through said handle mounting coupler and thereby prevent the disconnection of said wagon transport handle from said wagon.

15. The wagon recited in claim 11, wherein said wagon transport handle has a grip at one end thereof, a handle connector at the opposite end to be detachably connected to said wagon, a pair of outer rods extending between an upper lock connector and said handle connector, and at least one inner rod located between said pair of outer rods and extending between said grip and a lower lock connector, said grip being responsive to an upward pulling force applied thereto to cause said inner rod to move in an upward first direction relative to said pair of outer rods and through said upper lock connector so that said lower lock connector correspondingly moves in said upward direction with said inner rod towards and into locking engagement with said upper lock connector, whereby to prevent said inner rod and said lower lock connector from moving in a downward opposite direction away from said upper lock connector.

16. The wagon recited in claim 15, further comprising a lock carried by said lower lock connector and moving together with said lower lock connector and said inner rod in said upward first direction towards said upper lock connector so that said lock holds said lower lock connector in said locking engagement with said upper lock connector.

17. The wagon recited in claim 16, wherein said upper lock connector has a locking tab projecting therefrom and the lock carried by said lower lock connector has a locking cavity formed therein, said locking tab being removably received by said locking cavity, whereby said upper lock connector is held by said lock in said locking engagement with said lower lock connector.

18. The wagon recited in claim 17, wherein said lock is pivotally connected to said lower lock connector so that said lock is rotatable relative to said lower lock connector to correspondingly move the locking cavity formed in said lock out of its receipt of the locking tab projecting from said upper lock connector, whereby to enable said lower lock connector and said inner rod to move together with said lock in said downward opposite direction away from said upper lock connector.

19. A wagon having a front and a rear and comprising:
   a frame lying between the front and the rear of the wagon;
   a basket support rack;
   a basket having an open top and a closed bottom, said basket being held above said basket support rack by said frame;
   at least one wheel connected to said frame to enable said wagon to roll along a surface from place-to-place;
   a seat lying flat over the closed bottom of said basket to support the weight of an individual seated within said basket and a seat back to support the back of the seated individual, said seat back being pivotally connected to said seat and rotatable from a vertical position standing upwardly from said seat to a horizontal position lying over said seat; and
   a lock by which to prevent said seat back from rotating from said vertical position to said horizontal position so as to maintain said seat back in said vertical position, said lock being opened to permit said seat back to rotate from said vertical position to said horizontal position.

20. The wagon recited in claim 1, further comprising a pair of sides located at respective opposite sides of said seat, said pair of sides being rotatable towards the closed bottom of said basket when said lock is opened and said seat back is rotated from said vertical position to said horizontal position such that said pair of sides lay substantially flat over said seat back and said seat, said lock being detachably connected to one of said pair of sides.

* * * * *